A. G. JONES.
AIR COMPRESSING MEANS.
APPLICATION FILED FEB. 16, 1918.
1,333,923.
Patented Mar. 16, 1920.
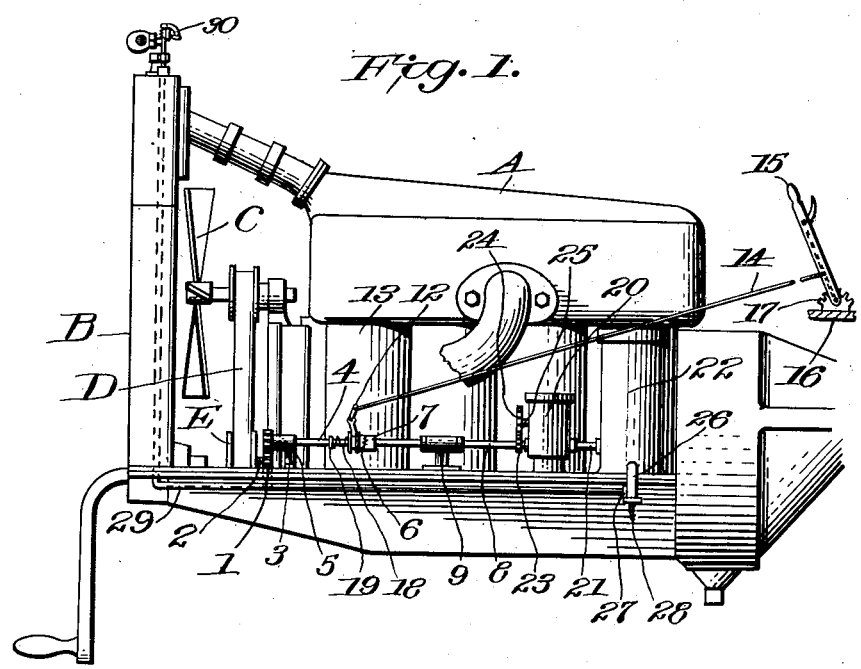
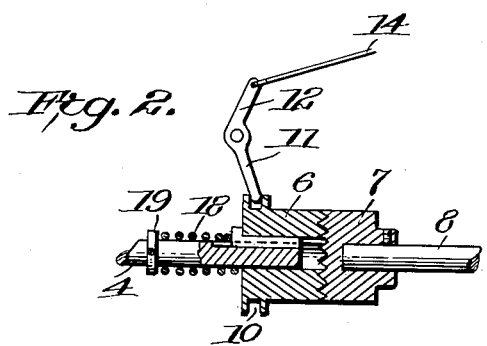
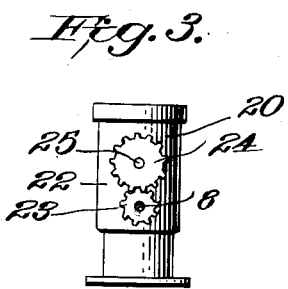
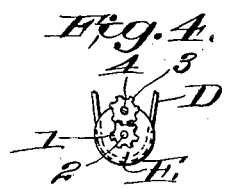
Witnesses:
Inventor,
Aaron G. Jones,
By
Attorney

UNITED STATES PATENT OFFICE.

AARON G. JONES, OF HARDWOOD, OKLAHOMA, ASSIGNOR OF ONE-HALF TO DIXON A. NOLEN, OF OLNEY, OKLAHOMA.

AIR-COMPRESSING MEANS.

1,333,923. Specification of Letters Patent. Patented Mar. 16, 1920.

Application filed February 16, 1918. Serial No. 217,563.

*To all whom it may concern:*

Be it known that I, AARON G. JONES, a citizen of the United States, residing at Hardwood, in the county of Coal and State of Oklahoma, have invented certain new and useful Improvements in Air-Compressing Means, of which the following is a specification.

This invention relates to air compressing means, and more particularly to air compressing means adapted to be connected to the engine of an automobile or similar vehicle so as to be actuated thereby.

One of the main objects of the invention is to provide air compressing means which may be connected directly to the engine of an automobile so as to be operated thereby, this means acting to drive air under pressure into a tank or reservoir from which this compressed air may be taken for inflating the tire, or for other purposes. A further object is to provide simple and efficient means whereby the operation of the compressor may be stopped when the air within the storage tank has reached a predetermined pressure, a suitable signal being connected to the storage tank so as to be operated thereby as soon as the air has reached this predetermined pressure. Further objects will appear from the detailed description.

In the drawings:

Figure 1 is a side view of an air compressing mechanism constructed in accordance with my invention, as applied, Fig. 2 is a fragmentary detail section of the control clutch, Fig. 3 is a side view of the compressor, Fig. 4 is a detail of the driving connections for the drive shaft of the compressor.

The engine A may be of any suitable construction, the cylinders being cooled by the radiator B adjacent the inner face of which is mounted the fan C which is rotated by the belt D driven from a pulley E geared to the crank shaft of the engine in the well known manner. All of these parts may be of any suitable or standard construction and do not form any part of the invention except in so far as they coöperate with the parts to be later described to effect the desired end.

A spur pinion 1 is secured on the shaft 2 of pulley E so as to rotate therewith. This pinion meshes with a pinion 3 secured on a shaft 4 rotatably mounted in a standard 5 secured to the engine bed. A clutch member 6 is slidably mounted on shaft 4 and is connected thereto by a feather connection, as in Fig. 2, so as to rotate with the shaft. This clutch element is adapted to engage a clutch head 7 secured on the forward end of a transmission shaft 8 rotatably supported in a standard 9 secured to the engine bed, and acts to transmit the rotary movement of shaft 4 to shaft 8 when the clutch members are in engagement, in the well known manner. Clutch member 6 is provided, adjacent its outer end, with an integral annular shoulder which is provided with an annular groove 10 which receives the lower end of one arm 11 of a bell crank lever 12 which is rockably mounted on the forward cylinder 13 of the engine. A cable 14 is secured at its forward end to the upper end of the upper arm of this lever, and the other end of this cable is secured to a hand lever 15 rockably mounted on the foot board 16 of the vehicle and provided with a spring pressed detent coöperating with a quadrant 17 to secure the lever in rocked adjustment, in the well known manner. An expansion coil spring 18 is mounted about shaft 4 and confined between the outer end of clutch member 6 and a collar 19 secured on the shaft for this purpose. This spring acts to normally maintain clutch member 6 in engagement with clutch head 7 so as to cause rotation of shaft 8 when the engine is in operation. By means of lever 15, bell crank lever 12 may be rocked so as to disengage the clutch members thus throwing the transmission shaft 8 out of operation.

Shaft 8 projects to the casing of a pump or compressor indicated generally by 20 adjacent the lower end thereof, and has its inner end seated in a boss formed on the surface of the cylindrical casing of the pump. A tank 22 is secured on the engine bed adjacent the pump. A spur gear 23 is keyed on shaft 8 adjacent compressor 20 and meshes with a pinion 24 which is secured on the drive shaft 25 of the compressor. By this means, the compressor is operatively connected to shaft 8 so as to be operated thereby, the air which is compressed being transmitted to the tank 22 through a suitable tube 21 so as to be stored therein, it being understood, of course, that the pump is provided with the usual check valves for controlling the inlet and exhaust of air therefrom, and to prevent back pressure of the air within the tank. Tank 22 is provided with outlet pipe 26 having a control cock 27, the outer end of this pipe being reduced and ridged to provide a nipple 28 to receive a hose for connecting the tank to a tire to be inflated, or for conducting the air to the point at which it is desired to utilize the same. A tube 29 communicates at its inner end with the outlet tube 26 of the tank 22 and is provided, at its outer end, with a suitable automatic alarm designated generally by 30 which will operate when the pressure of the air in the tank 22 has reached a predetermined point. This signal serves to notify the driver of an automobile that the air in tank 22 has reached the pressure desired, so that by operating the lever 15 the compressor may be thrown out of operation. By this means, air may be stored in the tank 22 at a predetermined pressure, while the pump is operated directly from the engine of the automobile, this air being easily available for inflating tires or for other purposes.

It will be evident that there may be slight changes made in the construction and arrangement of the different parts of my invention without departing from the field and scope of the same, and I intend to include all such variations, as fall within the scope of the appended claim, in this application in which a preferred form only of my invention is disclosed.

What I claim is:

The combination with an air compressor adapted for attachment to an internal combustion engine, a tank supported by the engine and connected to the compressor to receive air therefrom, the engine having a fan, a drive pulley mounted for operating the fan, a gear secured to the shaft of the pulley and operable thereby, a drive shaft mounted on the engine bed, a transmission shaft in longitudinal alinement with the drive shaft, gearing for actuating the two shafts, clutch means for interconnecting the adjacent ends of the drive shaft and transmission shaft, and means for driving the transmission shaft and the said compressor.

In testimony whereof I affix my signature in presence of two witnesses.

AARON G. JONES.

Witnesses:
E. WRIGHT,
G. L. KENNEDY.